United States Patent

Eskildsen et al.

[11] Patent Number: 5,854,698
[45] Date of Patent: Dec. 29, 1998

[54] REPEATERLESS BRANCH POWERED FIBER OPTIC COMMUNICATION SYSTEM

[75] Inventors: Lars Erik Eskildsen, Fair Haven; Evan Lee Goldstein, Princeton; Per Bang Hansen, Bradley Beach, all of N.J.

[73] Assignee: Lucent Technologies Inc., Murray Hill, N.J.

[21] Appl. No.: 797,157

[22] Filed: Feb. 10, 1997

[51] Int. Cl.$^6$ .............................. H04B 10/20; H04J 14/02
[52] U.S. Cl. ............................ 359/119; 359/134; 359/160
[58] Field of Search ................................... 359/119, 110, 359/134, 160, 179, 173, 341

[56] References Cited

U.S. PATENT DOCUMENTS 5,299,055  3/1994  Yoneyama ............................... 359/134
5,760,934  6/1998  Sutter et al. ............................. 359/119

Primary Examiner—Kinfe-Michael Negash

[57] ABSTRACT

The specification relates to a repeaterless branch powered fiber optic communications system. The system comprises an optical fiber cable trunk, configured in ring topology, with one or more telecommunications hub, and one or more branching unit serially interconnected therein. Branching units are provided as convenient add/drop points along the trunk ring from which branch fiber optic cable radially extend to cable stations. Cable stations insert and extract telecommunications traffic from the trunk ring over the branch fiber optic cables. In addition, the branch fiber optic cables are also coupled to light emitting power sources. The branch fiber optic cables deliver the energy produced from these power sources to optical amplifiers serially embedded within the branch fiber optic cables, the branching units, or the optical fiber cable trunks. The optical amplifiers convert the energy delivered from the branch fiber optic cables into amplified telecommunications signals. Thus, remote pumping or energy delivery is achieved without the requirement of additional optical fiber cable runs and further, using solely passive repeaterless components.

20 Claims, 2 Drawing Sheets

REPEATERLESS BRANCH POWERED FIBER OPTIC COMMUNICATION SYSTEM

FIELD OF THE INVENTION

The present invention relates to the field of optical fiber communications, and more particularly to system network design and incorporation of branch powered amplification within such networks.

BACKGROUND OF THE INVENTION

The emergence, development, and maturation of a practical optical fiber amplifier over the past decade has generated unprecedented expansion in the overall capabilities of undersea lightwave communications systems. As a result, transmission capacities for digital data have swiftly jumped by an order of magnitude, now reaching values in excess of 5 Gb/s. Moreover, new applications of wavelength-division-multiplexing technologies stand poised to raise undersea system capacities by another order of magnitude.

Today, the effort to expand and optimize point-to-point capacity in undersea transmission systems is receding in importance and the focus is shifting to other networking concerns. Prominent among these is the need to develop more reliable undersea lightwave systems that provide multipoint-to-multipoint connectivity. More precisely, there is a need to develop undersea networks in which all nodes remain optically connected in the event of an undersea cable cut, since such cuts represent the most common type of fault in undersea communications systems.

One general architectural feature known to enhance a network's survivability in the event of a cable fault is to configure the communications trunk in a ring topology. A communications trunk ring has the straightforward feature of remaining in a single piece in the event of a cable cut; maintaining connections at all trunk ring nodes despite an arbitrary single cable cut.

Another feature enhancing network survivability is the use of trunk and branch structures within a communication system. A cable cut in the branch of such a system isolates a single network node only, but other branches along the trunk remain operable.

A network that combines a trunk and branch structure with a ring geometry, will therefore exhibit strong survivability features in that (i) an arbitrary single trunk cut leaves all nodes connected and therefore no branch is isolated and communications along the entirety of the trunk and branch network remain intact; and (ii) any number of simultaneous branch cuts simply isolate the corresponding branches, preventing continued communications along those branches, but allowing all other communications to remain enabled within the trunk ring and further allowing access to the trunk by the remaining unsevered branches.

However, one substantial obstacle to building the robust trunk and branch ring network described above tends to be the cost of the required undersea optical repeaters, which are used for signal amplification. It is therefore desirable to develop a communications system which reduces the number of undersea repeaters that are required.

SUMMARY OF THE INVENTION

The present invention is a system for reducing or eliminating undersea optical repeaters in a trunk and branch ring network by replacing repeaters with remotely pumped optical amplifiers and remotely supplying energy to those optical amplifiers over the same branch cables that also distribute communications signals.

An optical fiber cable trunk is configured in ring topology with one or more telecommunications hub serially interconnected therein. The hub is an access point to the optical fiber cable trunk by a major switching office, such as a regional switching office, which routes communications onto or from the cable trunk.

Also coupled serially along the optical fiber cable trunk are one or more branching units. Branching units are optical coupling devices which allow for convenient add/drop points for telecommunications traffic from the cable trunk. Connected to the branching unit is a branch fiber optic cable which in turn is optically coupled at its other end to a cable station. A cable station accesses one or more of the signal wavelengths transported along the cable trunk. A cable station is bilateral in that communications signals are both sent to the cable trunk and retrieved from the cable trunk at this point.

The present invention utilizes the branch fiber optic cable, along which communications signals are transmitted and received, to further unidirectionally transmit optical energy at a wavelength other than that of signal wavelength. The optical energy is used as a power source for an optical amplifier, which is located in the branch fiber optic cable, the optical fiber cable trunk, or the branching unit. Signal amplification is thereby provided without the use of conventional optical repeaters.

A similar arrangement is also provided at the telecommunications hub, thereby allowing optical energy at a wavelength other than signal wavelength to be coupled onto the optical fiber cable trunk, to be transported along the hub with any existing optical communications signals, and to provide the energy necessary for signal amplification, all originating from the hub location. The hub is remotely located from the optical amplifier.

The combination of hub assemblies optically connected via a telecommunications cable trunk in a ring topology, with cable stations extracting and inserting trunk communication signals through branch fiber optic cables and further, those same branch fiber optic cables serving to deliver light energy to remotely located optical amplifiers, has the following advantages: (i) a single optical fiber cable trunk cut maintains full connectivity along the tunk and to all cable stations via their respective branch fiber optic cables; (ii) branch fiber optic cable cuts simply isolate the associated cable station without compromising ring integrity, this aspect being especially important since branch fiber optic cable cuts are more susceptible to failure by severing since they are typically located in shallower water than the optical fiber cable trunk; (iii) by virtue of its trunk and branch structure, such networks respect the sovereignty concerns that often arise in undersea communications networks; (iv) such networks are not restricted to fixed wavelength routing schemes, accommodations may be made to allow for reconfigurable wavelength add/drop branching units; and finally (v) repeaterless technology incorporating remote pumping of an optical energy source through the network's branch fiber optical cables, may be utilized as a means of reducing the capital costs as well as the operating and maintenance costs of communications networks.

BRIEF DESCRIPTION OF THE DRAWINGS

A more complete understanding of the present invention may be obtained from consideration of the following description in conjunction with the drawings in which.

DETAILED DESCRIPTION

Although the present invention is particularly well suited as an undersea application of a repeaterless trunk and branch wavelength-division-multiplexing (WDM) optical fiber communications ring network, and shall be described so with respect to this application, the present invention, as disclosed, can be applied to other methods of signal multiplexing and may also be used as a terrestrial communications system instead of in an undersea application.

Figure 1:
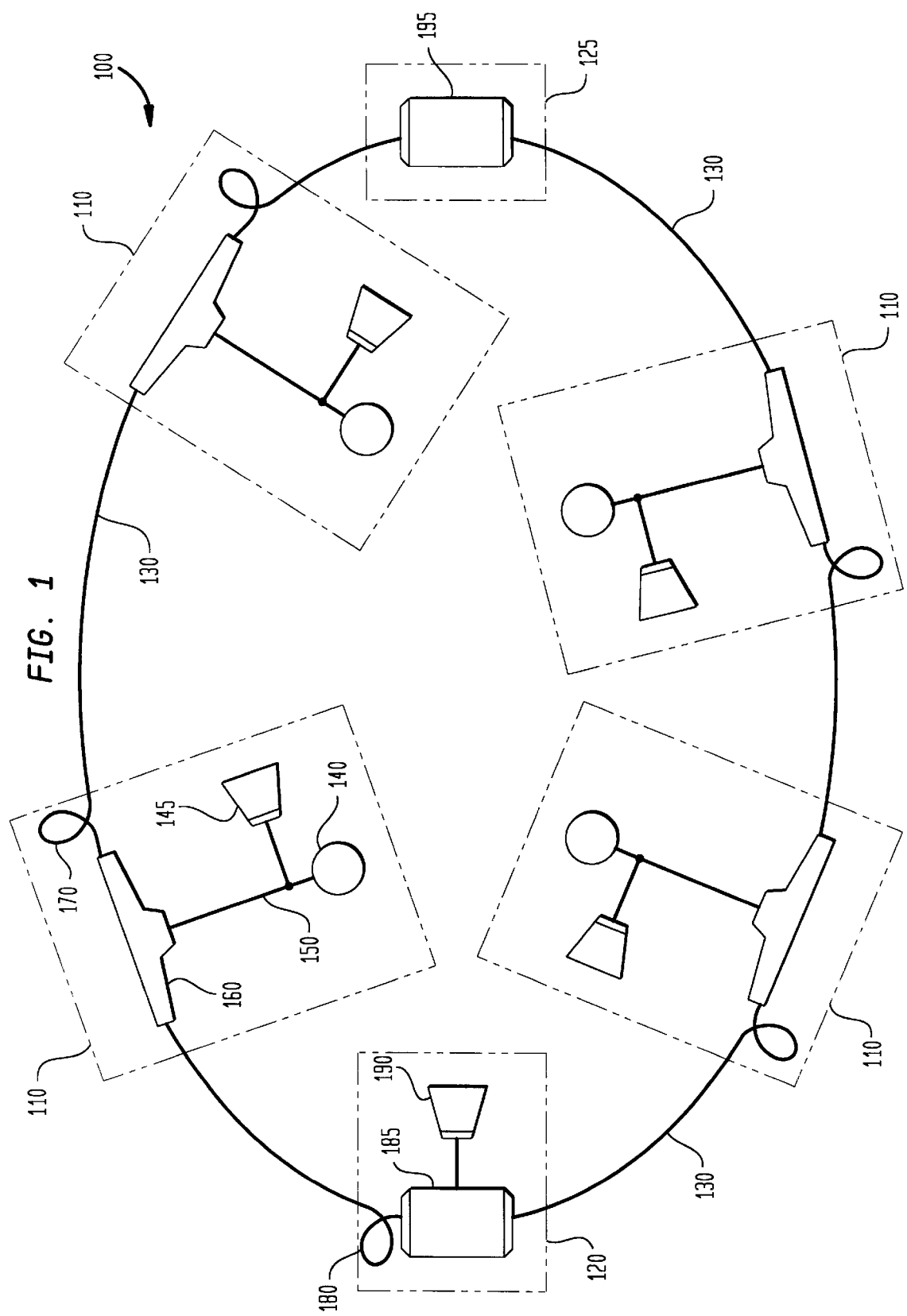
FIG. 1 is a block diagram of a repeaterless trunk and branch fiber optic ring network, incorporating the essential structures supporting and powering in-line optical amplifiers.

A block diagram representing the preferred embodiment of the present invention, generally indicated by the reference numeral 100, is provided in FIG. 1. The illustrated preferred system 100 includes four branch assemblies 110, a hub assembly with remote pumping 120, a hub assembly without remote pumping 125, each serially coupled by an optical fiber cable trunk 130 and configured in a ring topology. The present invention, however, is not limited by the number of each component incorporated within the system. For example, it is only required that the network contains at least one branch assembly 110 and at least one hub assembly, either with remote pumping 120 or without remote pumping 125.

Referring to FIG. 1, hub assembly with remote pumping 120 consists of a hub 185 coupled to both "ends" of the optical fiber cable trunk 130, so as to maintain ring topology continuity. It should be noted that, although only one fiber is shown for the optical fiber cable trunk 130 for the purpose of simplicity of explanation, in application there are generally a plurality individual fibers contained within the optical fiber cable trunk 130. Also optically coupled to the optical fiber cable trunk 130 is a light emitting power source 190, in this illustrative embodiment, through the hub 185 itself. The precise point at which the light emitting power source 190 is coupled to the optic fiber cable trunk 130 is not of imperative importance. The light source can also be coupled directly to the cable trunk 130 itself, either at a location separate and distinct from the hub 185, or coupled coterminously with the hub onto the optical fiber cable trunk 130. Located serially downstream the optical fiber cable trunk 130, and remotely located from the coupled hub 185 and the coupled light emitting power source 190, is an optical amplifier 180. The optical amplifier 180 typically consists of an erbium doped fiber which is able to amplify an attenuated telecommunications signal, converting the energy of an injected light source to produce signal amplification.

The hub 185 represents a typical large "regional clearinghouse" or "regional switching office" for communications signals destined to be extracted from or inserted onto the optical fiber cable trunk 130. The hub 185 is the location where telecommunications traffic is aggregated, groomed and routed, eventually to be coupled onto the optical fiber cable trunk 130. The hub 185 accepts telecommunications signals from local switching offices or from other colloquial telecommunications systems destined to be placed on the optical fiber cable trunk 130 and converts them to optical signals if necessary, multiplexes the optical signals, amplifies the resulting composite optical signal, and transfers the optical signal, containing all the original telecommunications information, onto the optical fiber cable trunk 130. For communications signals which are already present on the trunk and must pass through the hub 185 to get to their ultimate destination, the hub 185 first demultiplexes the optical signal, converts the signal to electrical signals, amplifies the electrical signals, reconverts the electrical signals to optical signals and finally multiplexes the optical signals prior to insertion back onto the optical fiber cable trunk 130. The preferred embodiment of the present invention contemplates that the optical signal transmitted along the optical fiber cable trunk 130 is a wavelength-division-multiplexed (WDM) signal, however, other forms of multiplexing are also contemplated, such as time-division-multiplexing. Also, the contemplated wavelengths for network optical signals is in the range of 1500–1600 nanometers (nm), since this wavelength band offers a window of low attenuation losses for transmission along a single mode fiber optic cable, however, other wavelengths and other types of fiber optic cable may also be chosen.

Light emitting power source 190 is coupled onto the optical fiber cable trunk 130, either through the hub 185 itself or directly onto the optical fiber cable trunk 130. If coupled directly onto the optical fiber cable trunk 130, the coupling may be accomplished either coterminously with the coupling for the hub 185, or at some point along the optical fiber cable trunk 130 between the hub 185 and the optical amplifier 180. The present invention utilizes a multiple order cascaded Raman laser, producing an output light source with a wavelength in the range of 1450–1500 nm, although other light sources and other wavelengths may be used. However, there are two constrictive requirements regarding the choice of light source and its corresponding wavelength. They are that (i) the laser chosen must be capable of producing light at a wavelength that ultimately can be used as an energy source for the intended optical amplifier 180 and (ii) the wavelength of light chosen must be distinct from the band of signal wavelengths contemplated for transmission along the optical fiber cable trunk 130.

Optical amplifier 180 is an erbium doped fiber amplifier. Although other optical fiber amplifiers may be chosen, the greatest success in amplifying signals in the 1500–1600 nm range is with erbium doped fiber amplifiers. The optical amplifier 180 is spliced or coupled with the optical fiber cable trunk 130. Its exact location, related as the distance of optical fiber length between the optical amplifier 180 and the light emitting power source 190, is to be determined by the network designer. The requirements for determining its placement are well known to those skilled in the art. Components currently available limit the maximum distance between the light emitting power source 190 and the optical amplifier 180 to about one hundred kilometers (km), but as more powerful light emitting power sources and fiber optic cables with lower attenuation and phase dispersion become available, this maximum distance will become greater. WDM multiplexed telecommunications traffic along the optical fiber cable trunk 130 passes between the hub 185 to the optical amplifier 180 bidirectionally. This may be accomplished by dedicating a specific fiber within the optical fiber cable trunk 130 to transmission of all wavelengths in one direction only, and designating another fiber within the optical fiber cable trunk 130 to transport signal wavelengths in the opposite direction. Alternatively, a single fiber within the optical fiber cable trunk 130 may transport signals at one wavelength is an assigned direction, and transport signals at another wavelength in the opposite direction.

Additionally and concurrently, the optical energy from the light emitting power source 190 is also being transferred from the hub 185 to the optical amplifier 180, at a wavelength other than the wavelengths of the WDM multiplexed signals. The erbium doped fiber amplifier 180 converts the energy delivered from the light emitting power source 190 and converts that energy into amplified telecommunications signals. The amplified signals then continue along the optical fiber cable trunk 130.

Other telecommunication hubs may be serially coupled within the optical fiber cable trunk 130. Additional telecommunications hubs may or may not include remote pumping and amplification. The embodiment as shown in FIG. 1 reveals one other hub assembly 125 incorporated within the ring trunk. Hub assembly without remote pumping 125 contains only one component element, the hub 195. The hub 195 performs exactly as described above regarding hub 185 incorporated into a hub assembly with remote pumping 120.

Again referring to FIG. 1, four branch assemblies 110 are incorporated into the network. In other embodiments of the present invention, as would be obvious to one skilled in the art, there may be as few as one branch assembly 110, or a plurality of branch assemblies 110, the exact number desired to be determined by the network designer. Branch assemblies 110 are convenient add/drop locations for telecommunications signals along the optical fiber cable trunk 130.

Figure 2:
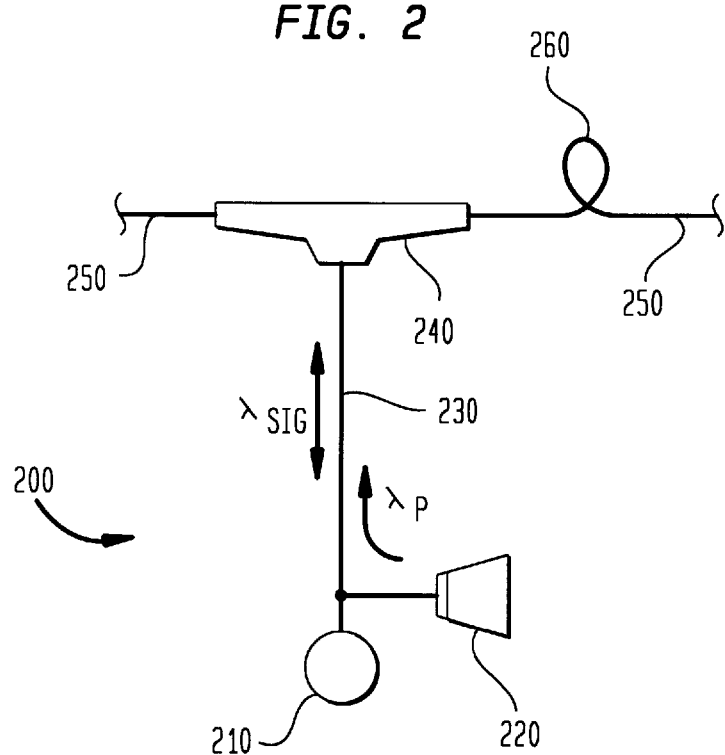
FIG. 2 is a block diagram of a branch assembly.

A block diagram of one branch assembly 200 is illustrated in FIG. 2. The branch assembly consists of a cable station 210 and a light emitting power source 220, each optically coupled to a branch fiber optic cable 230. In turn, the branch fiber optic cable 230 is optically coupled to a branching unit 240. The branching unit 240 maintains optical fiber cable trunk 250 continuity and is also optically coupled to the branch fiber optic cable 230. An optical amplifier 260 is shown serially embedded within the optical fiber cable trunk 250. It should be noted that, although only one fiber each is shown for the branch fiber optic cable 230 and the optical fiber cable trunk 250 for the purpose of simplicity of explanation, in application there are generally a plurality individual fibers contained within both.

Cable station 210 is a typical medium sized "local clearinghouse" or "local switching office" for communications signals destined to be extracted from or inserted onto the optical fiber cable trunk 250. The cable station 210 is the location where at least one wavelength, of the various optical signal wavelengths present on the optical fiber cable trunk 250, is either received from other local switching offices for eventual incorporation and transmission over the optical fiber cable trunk 250, or alternatively, is extracted from the optical fiber cable trunk 250 for eventual dissemination through the cable station 210 to a local telecommunications destination. The cable station 210 may process one signal wavelength or more, depending on the volume of telecommunications traffic anticipated in the local area in proximity to and serviced by the cable station 210. Therefore, the cable station 210 can include multiplexing/demultiplexing equipment if it is desired to process a plurality of optical wavelength signals destined for or extracted from the WDM telecommunications signals of the optical fiber cable trunk 250. The contemplated wavelength for optical signals accumulated at and disseminated from the cable station 210 is in the range of 1500–1600 nanometers (nm), corresponding to the band of wavelengths previously selected for transmission along the optical fiber cable trunk 250, since this wavelength band offers a window of low attenuation losses for transmission along a single mode fiber optic cable. However, the present invention is not restricted to these wavelengths alone.

A branch fiber optic cable 230 is optically coupled to the cable station 210. The branch fiber optic cable 230 transports bidirectional optical communications signals between the cable station 210 and the optical fiber cable trunk 250. As applied in the present configuration as an undersea telecommunications network, the branch fiber optic cable 230 is predominantly submerged. Much of the submerged branch fiber optic cable 230 is located in shallow water, being a branch from the optical fiber cable trunk 230 to the land based cable station 210, and is therefore particularly susceptible to damage from commercial boating and shipping. The optical fiber cable trunk 230 is typically located more than one hundred miles from the coastline and is therefore not as susceptible to failure.

The branch fiber optic cable 230 is coupled at its other end to a branching unit 240. The branching unit 240 is a coupling device, well known to those skilled in the art, used to maintain continuity along a fiber optic cable run, and simultaneously allow a convenient location to insert new signals onto or extract existing signals from that fiber optic cable run. The branching unit 240 is also known as an add/drop node. In the present embodiment, branching unit 240 maintains continuity along the optical fiber cable trunk 250 and simultaneously allows for insertion of new signals and extraction of existing signals via the branch fiber optic cable 230. The branching unit 240 bilaterally passes a discrete signal wavelength or wavelengths onto or from the branch fiber optic cable 230 and allows signals of other wavelengths to pass through the branching unit 240 and continue along the optical fiber cable trunk 250 to its ultimate destination. In the present embodiment, a branching unit 240 is selected which is tunable. That is, the optical signal wavelengths that are diverted and branched to and from the branch fiber optic cable 230 are adjustable. This feature allows for system network reconfiguration as cable station 210 processing components are added, deleted, upgraded, or otherwise changed.

A key element of the present invention concerns the light emitting power source 220, which is coupled onto the branch fiber optic cable 230, either through the cable station 210 itself or directly onto the branch fiber optic cable 230. If coupled directly onto the branch fiber optic cable 230, the coupling may be accomplished either coterminously with the coupling for the cable station 210, or at some point along the branch fiber optic cable 230 between the branching unit 240 and the cable station 210. In the preferred embodiment, the light emitting power source 220 is coupled to the branch fiber optic cable 230 coterminously with the cable station 210 coupling. This allows the light emitting power source 220 to be physically located at the land based cable station 210 and obviates the need for a second fiber optic cable run to transport the light emitting power source's energy to the branch fiber optic cable 230. The energy of the light emitting power source 220 is transferred unidirectionally over the branch fiber optic cable 230, which also simultaneously transports the bidirectional optical telecommunications signals. The energy is coupled through the branching unit 240 onto the optical fiber cable trunk 250, to be used in the optical amplifier 260 as the energy source to amplify attenuated optical fiber cable trunk 250 communication signals. By so doing, amplification of attenuated signals is achieved using solely passive repeaterless components without the requirement of additional optical fiber cable runs.

The light emitting power source 220 utilized is similar to the light emitting power source used previously in conjunction with the hub assembly. The present invention utilizes a multiple order cascaded Raman laser, producing an output light source with a wavelength in the range of 1450–1500 nanometers (nm), although other light sources and other light sources and other wavelengths may be used. However, there are two constrictive requirements regarding the choice of the light source and its corresponding wavelength. They are that (i) the light source chosen must be capable of producing light at a wavelength that ultimately can be used as an energy source for the intended optical amplifier 260 and (ii) the wavelength of light chosen must be distinct from the band of signal wavelengths contemplated for transmission along the branch fiber optic cable 230 and the optical fiber cable trunk 250.

An optical amplifier 260 is serially coupled and embedded in the optical fiber cable trunk 250. The optical amplifier 260 utilized in the present embodiment is an erbium doped fiber amplifier. Although other optical fiber amplifiers may be used, erbium doped fiber amplifiers currently offer the greatest efficiency and performance in the 1500–1600 nm range of wavelengths. The optical amplifier 260 is either coupled or spliced and then sealed within the optical fiber cable trunk 260.

The exact location of the optical amplifier 260 along the optical fiber cable trunk 250 is not crucial. The optical amplifier 260 may also be coupled at the branching unit 240, or within the branch fiber optic cable 230. However, it is crucial to design the branch assembly 200 so that total cable distance between the optical amplifier 260 and the light emitting power source 220 is not so great that the quantum of energy which is being transmitted is completely or effectively attenuated prior to reaching the optical amplifier. Currently, the maximum effective distance between an erbium doped fiber amplifier and a Raman laser supplying energy to that fiber amplifier over single mode optical fiber is approximately one hundred kilometers (km). This limitation exists because current single mode fibers have attenuation losses of about −0.2 dB/km (decibels per kilometer). If transmitted over one hundred kilometers, a total energy loss of minus twenty decibels occurs, or one per cent of its initial energy. However, as optical fiber with lower attenuation constants are manufactured, more powerful light sources are developed, and more effective optical amplifiers become available, the limiting distance between light emitting power source and optical amplifier will become much greater.

Figure 3:
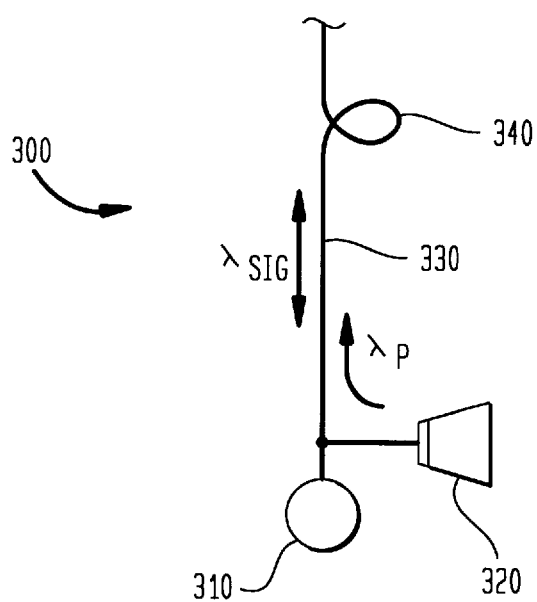
FIG. 3 is a block diagram of a repeaterless branch powered fiber optic communication system segment.

As stated earlier, the optical amplifier does not need to be coupled in the optical fiber cable trunk. FIG. 3 illustrates a repeaterless branch powered fiber optic communications system segment 300. Included in the system segment 300 are a cable station 310, a light emitting power source 320, a branch fiber optic cable 330, and an optical amplifier 340. It should be noted that, although only one fiber is shown for the branch fiber optic cable 330 for the purpose of simplicity of explanation, in application there are generally a plurality individual fibers contained within the branch fiber optic cable 330. The system segment 300 represents a portion of the branch assembly previously discussed, except that the branch fiber optic cable 330 contains the erbium doped fiber amplifier. The cable station 310 is optically coupled with the branch fiber optic cable 330 and transmits and receives optical communications signals passing thereover. A light emitting power source 320 producing energy at a wavelength other than at signal wavelength is coupled to the same branch fiber optic cable 330. As before, the cable station and light emitting power source are coupled coterminously. Thus the same branch fiber optic cable 330 unidirectionally transmits energy from the power source 320 at a wavelength other than the signal wavelength and simultaneously and bilaterally transmits an optical telecommunications signal or signals at a wavelength other than the aforementioned energy wavelength. An optical amplifier 340 is serially coupled within the branch to accept the energy transmitted thereover and convert that energy into amplified telecommunications signals.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

What is claimed is:

1. A repeaterless branch powered fiber optic communication system segment having a cable station, comprising:

a branch fiber optic cable coupled with said cable station for bilateral transmission of an optical signal at a signal wavelength;

a light emitting power source producing energy at a wavelength other than said signal wavelength coupled to said branch fiber optic cable for unidirectional transmission thereover; and an optical amplifier coupled within said branch fiber optic cable and powered by said energy for amplifying said optical signal.

2. The system segment in accordance with claim 1 wherein said light emitting power source comprises a laser.

3. The system segment in accordance with claim 1 wherein said optical amplifier comprises an erbium doped fiber amplifier.

4. The system segment in accordance with claim 1 wherein said light emitting power source and said cable station are coterminously optically coupled to said branch fiber optic cable.

5. A repeaterless trunk and branch fiber optic communication system having a cable station, comprising:

a branch fiber optic cable interconnecting said cable station for bilateral transmission of an optical signal at a signal wavelength;

a light emitting power source producing energy at a wavelength other than said signal wavelength coupled to said branch fiber optic cable for unidirectional transmission thereover;

a branching unit simultaneously accepting said bilateral transmission of said optical signal and transporting said energy at a wavelength other than said signal wavelength;

an optical fiber cable trunk receiving and transporting thereover said optical signal and said energy which is at a wavelength other than said signal wavelength; and an optical amplifier in said optical fiber cable trunk powered by said energy for amplifying said optical signal.

6. The system in accordance with claim 5 wherein said light emitting power source comprises a laser.

7. The system in accordance with claim 6 wherein said laser comprises a Raman laser.

8. The system in accordance with claim 5 wherein said optical amplifier comprises an erbium doped fiber amplifier.

9. The system segment in accordance with claim 5 wherein said light emitting power source and said cable station are coterminously optically coupled with said branch fiber optic cable.

10. A repeaterless trunk and branch fiber optic ring network, comprising:

at least one branch assembly;

at least one hub assembly;

an optical fiber cable trunk coupling said at least one branch assembly and said at least one hub assembly, said optical fiber cable trunk enabling a plurality of telecommunications traffic between said branch assembly and said hub assembly; and wherein said at least one branch assembly contains:
- a cable station transmitting and receiving at least one telecommunications signal, said cable station optically coupled with a branch fiber optic cable;
- a light emitting power source generating and delivering energy to said branch fiber optic cable at a wavelength other than the wavelength of said telecommunications traffic;
- a branching unit optically coupling said optical fiber cable trunk with said branch fiber optic cable; and
- an optical amplifier embedded within said optical fiber cable trunk, said optical amplifier powered by said energy for amplifying said plurality of telecommunications traffic.

11. The network in accordance with claim 10 wherein said plurality of telecommunications traffic is transmitted as a wavelength-division-multiplexed signal.

12. The network in accordance with claim 11 wherein said optical amplifier and said optical fiber cable trunk are coupled coterminously at said branching unit.

13. The network in accordance with claim 11 wherein said light emitting power source and said cable station are coterminously optically coupled to said branch fiber optic cable.

14. The network in accordance with claim 13 wherein said optical amplifier and said optical fiber cable trunk are coupled coterminously at said branching unit.

15. The network in accordance with claim 10 wherein said at least one hub assembly contains a hub optically coupled to said optical fiber cable trunk comprising:
- a light emitting power source optically coupled to said optical fiber cable trunk coterminously with said hub, said light emitting power source producing energy at a wavelength other than the wavelengths of said plurality of telecommunications traffic and delivering said energy to said optical fiber cable trunk; and
- an optical amplifier embedded within said optical fiber cable trunk, said optical amplifier powered by said energy for amplifying said plurality of telecommunications traffic.

16. The network in accordance with claim 15 wherein said optical amplifier and said optical fiber cable trunk are coupled coterminously at said branching unit.

17. The network in accordance with claim 15 wherein said light emitting power source and said cable station are coterminously optically coupled to said branch fiber optic cable.

18. The network in accordance with claim 17 wherein said optical amplifier and said optical fiber cable trunk are coupled coterminously at said branching unit.

19. The network in accordance with claim 18 wherein said plurality of telecommunications traffic is transmitted as a wavelength-division-multiplexed signal.

20. The network in accordance with claim 19 wherein said optical amplifier comprises an erbium doped fiber amplifier.

* * * * *